(12) United States Patent
Usui

(10) Patent No.: US 9,043,045 B2
(45) Date of Patent: May 26, 2015

(54) TRAVEL ASSIST APPARATUS AND TRAVEL ASSIST METHOD

(75) Inventor: Tasuku Usui, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/000,275

(22) PCT Filed: Feb. 21, 2011

(86) PCT No.: PCT/JP2011/053696
§ 371 (c)(1),
(2), (4) Date: Aug. 19, 2013

(87) PCT Pub. No.: WO2012/114433
PCT Pub. Date: Aug. 30, 2012

(65) Prior Publication Data
US 2013/0345900 A1    Dec. 26, 2013

(51) Int. Cl.
*B60W 30/12*  (2006.01)
*B60W 10/18*  (2012.01)
*B60W 10/20*  (2006.01)
*B60W 30/095* (2012.01)
*B60W 50/00*  (2006.01)

(52) U.S. Cl.
CPC ............. *B60W 10/20* (2013.01); *B60W 30/12* (2013.01); *B60W 30/0953* (2013.01); *B60W 2050/0075* (2013.01); *B60W 2520/12* (2013.01); *B60W 10/18* (2013.01)

(58) Field of Classification Search
CPC . B60W 30/12; B60W 30/0953; B60W 10/20; B60W 10/18; B60W 2520/12; B60W 2550/0075
USPC .............. 701/1, 41, 96, 301, 36, 70; 340/435, 340/436, 903; 180/167
See application file for complete search history.

(56) References Cited

U.S. PATENT DOCUMENTS

2005/0107939 A1* 5/2005 Sadano et al. ................... 701/70
2007/0032914 A1* 2/2007 Kondoh et al. ................... 701/1

FOREIGN PATENT DOCUMENTS

JP  A-2002-362395  12/2002
JP  EP1884449  * 2/2008  .............. B62D 8/00
JP  A-2010-247656  11/2010

* cited by examiner

*Primary Examiner* — Marthe Marc-Coleman
(74) *Attorney, Agent, or Firm* — Oliff PLC

(57) ABSTRACT

A travel assist apparatus performs assist of warning or auxiliary for preventing departure of a vehicle in a lateral direction of the vehicle. A value of the estimated time to lane crossing at which assist is to be performed is varied in accordance with the velocity of the vehicle in the lateral direction. This enables selection of a value of the estimated time to lane crossing at which assist is to be performed that is suitable for the velocity of the vehicle in the lateral direction, enabling optimization of the timing of performing assist. Therefore, assist of warning or auxiliary is performed in an optimal way without bothering the driver.

10 Claims, 7 Drawing Sheets

TRAVEL ASSIST APPARATUS AND TRAVEL ASSIST METHOD

TECHNICAL FIELD

The present invention relates to a travel assist apparatus and a travel assist method.

BACKGROUND ART

There has been disclosed a technology in which when multiple kinds of risk information are generated, the display mode of warning displays respectively indicating multiple kinds of risk information on display means provided in a vehicle is changed according to predetermined conditions (see, for example, patent document 1). Moreover, patent document 1 teaches to generate risk information when it is determined that the vehicle will depart from a partition line on the road on which the vehicle is traveling.

CITATION LIST

Patent Literature

PTL 1: Japanese Patent Application Laid-Open No. 2010-247656

SUMMARY OF INVENTION

Technical Problem

There has been developed a concept of assist of warning or auxiliary for preventing departure of a vehicle in the lateral direction of the vehicle with reference to a line such as a carriageway making on the road on which the vehicle is traveling. The vehicle travel assist can lead to prevention of accidents. However, if the assist is performed excessively, the driver will feel the assist bothering. Moreover, delay in performing the assist will make the assist unsatisfactory.

The present invention has been made in view of the above-described problems, and an object of the present invention is to provide a technology that enables to perform assist of warning or auxiliary in an optimal way without bothering the driver.

Solutions to Problem

In the present invention, the following feature is adopted. According to the present invention, there is provided a travel assist apparatus that performs assist of warning or auxiliary for preventing departure of a vehicle in a lateral direction of the vehicle, wherein the value of estimated time to lane crossing at which assist is to be performed is varied in accordance with the velocity of said vehicle in the lateral direction.

The velocity of the vehicle in the lateral direction mentioned here is the velocity with respect to the direction perpendicular to the direction in which the vehicle should travel along a travel assist line, namely the velocity with respect to the direction in which the vehicle departs from the travel assist line.

The travel assist line mentioned here is a line running by the side of the vehicle, and departing of the vehicle from the travel assist line should be prevented. A road marking indicating a lane boundary per se is set as the travel assist line, or the travel assist line is set based on a road marking indicating a lane boundary or non-travelable areas. Examples of the road marking indicating a lane boundary include lines on the road surface such as white lines, yellow lines, and dotted lines, central dividers or inter-lane partitions such as road studs and light-emitting members, and boundaries (partition lines) between the roadway and the portion other than the roadway such as boundaries between asphalt-paved surface and gravel surface. Examples of the non-travelable area include obstacles, such as guard rails, fences, sidewalls, curbs, walkers, bicycles and other vehicles, and areas having a level difference from the surface on which the vehicle is traveling, such as side ditches, recesses, and steps. The non-travelable areas also include areas in which it is not intended to allow the vehicle to travel and areas in which traveling by vehicle is undesirable, in addition to areas in which vehicles cannot travel.

The time at which assist is to be performed refers to the time at which the vehicle actually performs assist of warning or auxiliary.

The estimated time to lane crossing is the estimated time taken for the vehicle to depart from the travel assist line estimated based on the present state of vehicle.

The present invention enables to select a value of the estimated time to lane crossing at which assist is to be performed suitable for the velocity of the vehicle in the lateral direction, enabling optimization of the timing of performing assist. Therefore, assist of warning or auxiliary can be performed in an optimal way without bothering the driver.

It is preferred that the value of the estimated time to lane crossing at which assist is to be performed be varied in accordance with the velocity of said vehicle in the lateral direction using different characteristics of relationship between the velocity of said vehicle in the lateral direction and said value of the estimated time to lane crossing at which assist is to be performed in respective velocity ranges into which velocities of said vehicle in the lateral direction are classified.

According to the present invention, optimum characteristic relationships between the velocity of the vehicle in the lateral direction and the value of the estimated time to lane crossing at which assist is to be performed can be used in the respective velocity ranges. This enables to select a value of the estimated time to lane crossing at which assist is to be performed that is suitable for the lateral velocity of the vehicle in each velocity range, optimizing the timing of performing assist. Therefore, assist of warning or auxiliary can be performed in an optimal way without bothering the driver.

In the present invention, furthermore, the following feature is adopted. According to the present invention, there is provided a travel assist apparatus that performs assist of warning or auxiliary for preventing departure of a vehicle in a lateral direction of the vehicle, wherein, in a high velocity range among velocity ranges into which velocities of said vehicle in the lateral direction are classified, the value of estimated time to lane crossing at which assist is to be performed is varied in accordance with the velocity of said vehicle in the lateral direction using a characteristic relationship in which the higher the velocity of said vehicle in the lateral direction is, the smaller the value of the estimated time to lane crossing at which assist is to be performed is.

According to the present invention, in the high velocity range, an optimum characteristic relationship in which the value of the estimated time to lane crossing at which assist is to be performed is decreased as the velocity of the vehicle in the lateral direction increases can be used. This enables to select a value of the estimated time to lane crossing at which assist is to be performed that is suitable for the lateral velocity of the vehicle in the high velocity range, optimizing the timing of performing assist. Therefore, it is possible to prevent a situation in which a characteristic relationship in which the value of the estimated time to lane crossing at which assist is to be performed is increased as the lateral velocity of the vehicle increases is used in the high velocity range, bothering the driver by warning due to unduly early timing of performing assist in the high velocity range. Therefore, assist of warning or auxiliary can be performed in an optimal way without bothering the driver.

In a middle velocity range among the velocity ranges into which velocities of said vehicle in the lateral direction are classified, it is preferred that the value of the estimated time to lane crossing at which assist is to be performed be varied in accordance with the velocity of said vehicle in the lateral direction using a characteristic relationship in which the higher the velocity of said vehicle in the lateral direction is, the larger the value of the estimated time to lane crossing at which assist is to be performed is.

According to the present invention, in the middle velocity range, an optimum characteristic relationship in which the value of the estimated time to lane crossing at which assist is to be performed is increased as the velocity of the vehicle in the lateral direction increases can be used. This enables to select a value of the estimated time to lane crossing at which assist is to be performed that is suitable for the lateral velocity of the vehicle in the middle velocity range, optimizing the timing of performing assist. Therefore, it is possible to prevent a situation in which a characteristic relationship in which the value of the estimated time to lane crossing at which assist is to be performed is decreased as the lateral velocity of the vehicle increases is used in the middle velocity range, leading to unsatisfactory assist due to unduly delayed timing of performing assist in the middle velocity range. Therefore, assist of warning or auxiliary can be performed in an optimal way without bothering the driver.

It is preferred that, for each velocity range of said plurality of velocity ranges, different lines be used as reference lines running by the side of said vehicle, which are used to set the value of the estimated time to lane crossing at which assist is to be performed.

According to the present invention, optimum reference lines can be used in the respective velocity ranges to prevent the timing of performing assist from being so early that assist bothers the driver or from being so late that assist becomes unsatisfactory. Therefore, assist of warning or auxiliary can be performed in an optimal way without bothering the driver.

In the present invention, furthermore, the following feature is adopted. According to the present invention, there is provided a travel assist method of performing assist of warning or auxiliary for preventing departure of a vehicle in a lateral direction of the vehicle, wherein the value of estimated time to lane crossing at which assist is to be performed is varied in accordance with the velocity of said vehicle in the lateral direction.

In the present invention, furthermore, the following feature is adopted. According to the present invention, there is provided travel assist method of performing assist of warning or auxiliary for preventing departure of a vehicle in a lateral direction of the vehicle, wherein, in a high velocity range among velocity ranges into which velocities of said vehicle in the lateral direction are classified, the value of estimated time to lane crossing at which assist is to be performed is varied in accordance with the velocity of said vehicle in the lateral direction using a characteristic relationship in which the higher the velocity of said vehicle in the lateral direction is, the smaller the value of the estimated time to lane crossing at which assist is to be performed is.

According to the invention as described above, it is possible to select a value of the estimated time to lane crossing at which assist is to be performed that is suitable for the lateral velocity of the vehicle, and it is possible to optimize the timing of performing assist. Therefore, assist of warning or auxiliary can be performed in an optimal way without bothering the driver.

Advantageous Effects of Invention

According to the present invention, assist of warning or auxiliary can be performed in an optimal way without bothering the driver.

DESCRIPTION OF EMBODIMENTS

In the following, specific embodiments of the present invention will be described. What is described herein is a driving assist apparatus (or travel assist apparatus such as LDW and LOP) that recognizes a lane and non-travelable areas and carries out a driving assist process for preventing departure of a vehicle in the lateral direction on the basis of the recognized lane and non-travelable areas. The driving assist process mentioned here is executed earlier than a collision damage reduction process that is executed when the vehicle stops urgently or when collision of the vehicle with an obstacle is unavoidable, and provides assist in such a way as to allow the vehicle to continue running. In this respect, the driving assist apparatus according to the present invention is different, from the driving assist apparatus that performs a collision damage reduction process (e.g. PCS and the like). The construction described with the following embodiment illustrates a mode of the present invention and is not intended to limit the construction according to the present invention.

Embodiment 1

Driving Assist Apparatus

Figure 1:
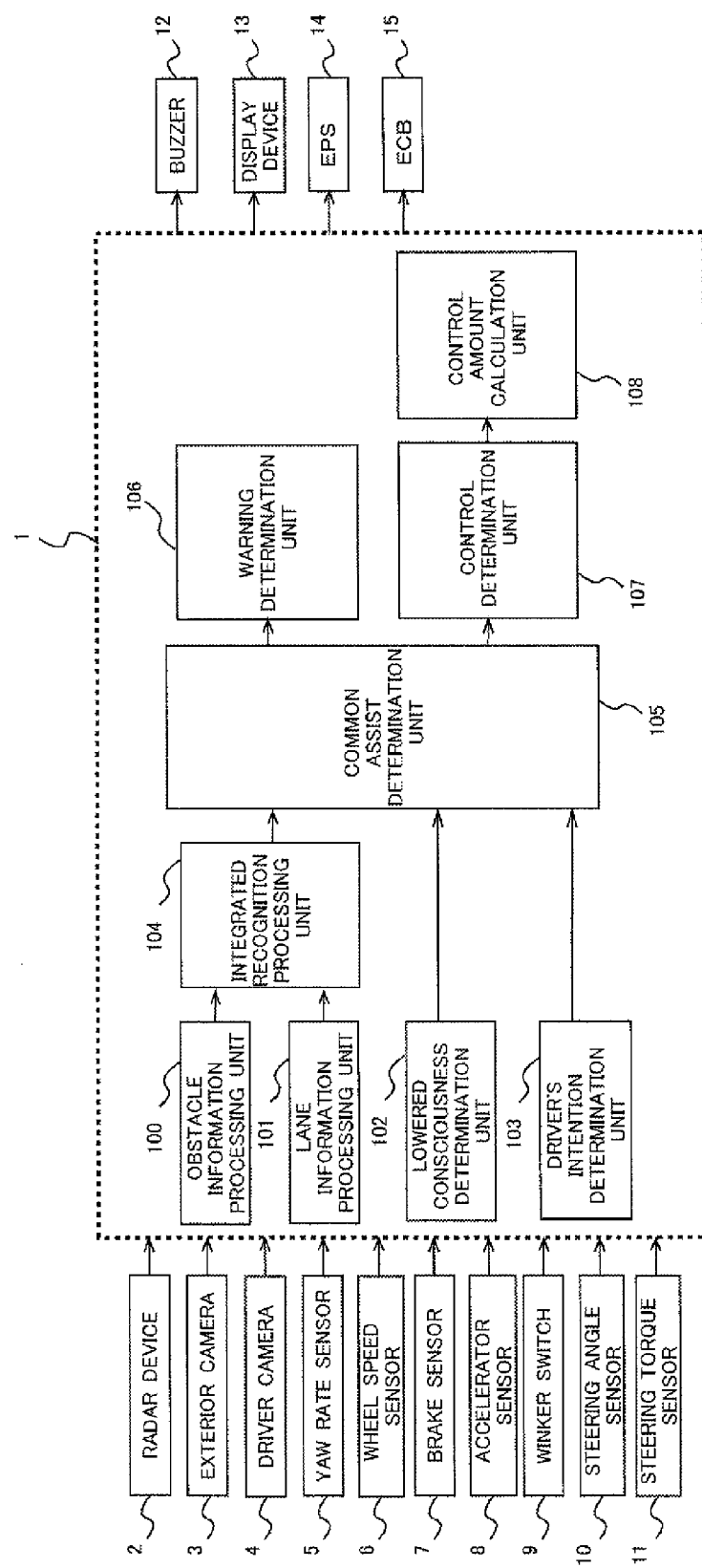
FIG. 1 is a block diagram showing the functional configuration of a driving assist apparatus according to embodiment 1 of the present invention.

FIG. 1 is a block diagram showing the functional configuration of a driving assist apparatus (travel assist apparatus) according to embodiment 1 of the present invention. As shown in FIG. 1, a vehicle is equipped with an electronic control unit (ECU) 1 used for driving assist, which constitutes the driving assist apparatus.

The ECU 1 is an electronic control unit including a CPU, a ROM, a RAM, a backup RAM, and I/O interface etc. The ECU 1 is electrically connected with various sensors such as a radar device 2, an exterior camera 3, a driver camera 4, a yaw rate sensor 5, a wheel speed sensor 6, a brake sensor 7, an accelerator sensor 8, a winker switch 9, a steering angle sensor 10, and a steering torque sensor 11, and signals output from these sensors are input to the ECU 1.

The radar device 2, which is mounted in the front part of the vehicle, emits millimeter radio waves in the forward direction of the vehicle and receives reflected waves reflected by an obstacle outside the vehicle to output information about the position of the obstacle relative to the vehicle (e.g. coordinate information). The exterior camera 3 is arranged at such a position in the cabin that allows it to capture the vehicle's forward field in its field of view and outputs an image of the vehicle's forward field. The driver camera 4 is arranged at such a position in the cabin that allows it to capture the driver in its field of view and outputs an image of the driver. The yaw rate sensor 5 is mounted on the vehicle body and outputs an electrical signal correlating with the yaw rate of the vehicle. The wheel speed sensor is attached to a wheel of the vehicle and outputs an electrical signal correlating with the running speed of the vehicle.

The brake sensor 7 is attached to a brake pedal provided in the cabin and outputs an electrical signal correlating with the operation torque of (or depression force acting on) the brake pedal. The accelerator sensor is attached to an accelerator pedal provided in the cabin and outputs an electrical signal correlating with the operation torque of (or depression force acting on) the brake pedal. The winker switch 9 is attached to a winker lever provided in the cabin and outputs an electrical signal correlating with the direction indicated by the winker (direction indicator) when the winker lever is operated. The steering angle sensor 10 is attached to the steering rod connected with the steering wheel provided in the cabin and outputs an electrical signal correlating with the rotational angle of the steering wheel relative to a neutral position. The steering torque sensor 11 is attached to the steering rod and outputs an electrical signal correlating with the toque (steering torque) exerted on the steering wheel.

The ECU 1 is also connected with various devices such as a buzzer 12, a display device 13, an electric power steering (EPS) 14, and an electronically controlled brake (ECB) 15. These devices are adapted to be electrically controlled by the ECU 1.

The buzzer 12 is provided in the cabin to provide warning sound or the like. The display device 13 is provided in the cabin to display various messages and warning light. The electric power steering (EPS) 14 assists the operation of the steering wheel utilizing torque generated by an electric motor. The electronically controlled brake (ECB) 15 electrically adjusts the operation oil pressure (brake oil pressure) of the friction brakes provided for the respective wheels.

In order to control the devices using the output signals of the above-described sensors, the ECU 1 has the following functions. Specifically, the ECU 1 has an obstacle information processing unit 100, a lane information processing unit 101, a lowered consciousness determination unit 102, a driver's intention determination unit 103, an integrated recognition processing unit 104, a common assist determination unit 105, a warning determination unit 106, a control determination unit 107, and a control amount calculation unit 108.

The obstacle information processing unit 100 obtains a regression line that enable avoidance of a plurality of non-travelable areas by approximation on the basis of coordinate information of a plurality of obstacles output from the radar device 2 and generates coordinate information of the regression line and information about the yaw angle of the vehicle relative to the regression line etc. When a non-travelable area such as a single obstacle is detected by the radar device 2, the obstacle information processing unit 100 also generates coordinate information of the non-travelable area and information about the yaw angle of the vehicle relative to the non-travelable area. The obstacle information processing unit 100 may generate information about non-travelable areas on the basis of an image captured by the exterior camera 3. Examples of the non-travelable area include obstacles, such as guard rails, fences, sidewalls, curbs, walkers, bicycles and other vehicles, and areas having a level difference from the surface on which the vehicle is traveling, such as side ditches, recesses, and steps. The non-travelable areas also include areas in which it is not intended to allow the vehicle to travel and areas in which traveling by vehicle is undesirable, in addition to areas in which vehicles cannot travel.

The lane information processing unit 101 generates information about the lane and information about the posture of the vehicle relative to the lane on the basis of an image captured by the exterior camera 3. The information about the lane includes information about road markings indicating lane boundaries and information about the lane width indicated by the road markings. Examples of the road markings indicating lane boundaries include lines (partition lines) on the road surface such as white lines, yellow lines, and dotted lines, central dividers or inter-lane partitions such as road studs and light-emitting members, and boundaries between the roadway and the portion other than the roadway such as boundaries between asphalt-paved surface and gravel surface. The information about the posture of the vehicle relative to the lane includes information about the distance between a road marking indicating a lane boundary and the vehicle, information about the offset amount of the vehicle position from the center of the lane, information about the yaw angle of the traveling direction of the vehicle relative to a road marking indicating a lane boundary. In the case where the vehicle is equipped with a navigation system, the lane information processing unit 101 may generate information about the lane on the basis of map information and GPS information that the navigation system has.

The lowered consciousness determination unit 102 determines the level of lowering of consciousness (or the level of wakefulness) of the driver on the basis of an image captured by the driver camera 4. The lowered consciousness determination unit 102 calculates driver's eye closure time and eye closure frequency from the image captured by the driver camera 4, and determines that the consciousness level of the driver is low (namely, the wakefulness level is low), when the eye closure time or the eye closure frequency exceeds an upper limit. The lowered consciousness determination unit 102 may calculate the duration of time during which the orientation of the driver's face or the direction of the driver's line of sight deviates from the traveling direction of the vehicle from the image captured by the drier camera 4, and determine that the driver is looking aside, when the calculated duration of time exceeds an upper limit.

The driver's intention determination unit 103 determines whether or not changes in the operation amount of the brake pedal, changes in the operation amount of the accelerator pedal, or changes in the operation (or steering) amount of the steering wheel are made intentionally by the driver on the basis of the output signals of the wheel speed sensor 6, the brake sensor 7, the accelerator sensor 8, the winker switch 9, the steering angle sensor 10, and the steering torque sensor 11.

The integrated recognition processing unit 104 sets a traveling lane in which the vehicle can run on the basis of the information generated by the obstacle information processing unit 100 and the information generated by the lane information processing unit 101 and determines the yaw angle of the vehicle relative to the traveling lane boundaries and the offset amount of the vehicle from the traveling lane center. Basically, the traveling lane is set to have a width equal to the lane width. In other words, the traveling lane boundaries coincide with the travel assist lines. The travel assist line mentioned here is a line running by the side of the vehicle, from which the vehicle should be prevented from departing. In the case of a road with a narrow lane width, it is sometimes the case that the driver inevitably drives the vehicle to depart from the lane. In view of this, in the case of a road with a narrow lane width, the integrated recognition processing unit 104 may be adapted to set a traveling lane that extends out of the lane on the basis of information about road markings indicating the boundaries of the lane and information about non-travelable areas existing by the lane. Specifically, the integrated recognition processing unit 104 may set, on the basis of road markings indicating the lane boundaries, a provisional traveling lane extending beyond the road markings and then set a definitive traveling lane extending beyond the road markings on the basis of the provisional traveling lane and the non-travelable areas. When the integrated recognition processing unit 104 receives information about a single non-travelable area from the obstacle information processing unit 100, the integrated recognition processing unit 104 may extend the length of the non-travelable area along the direction parallel to the road in setting the traveling lane. In other words, in setting the traveling lane, the integrated recognition processing unit 104 may regard a non-travelable area detected as a point in a coordinate system as a line in the coordinate system. The amount of extension (i.e. the length of the line) in doing so may be set to be longer when the level of the output signal of the wheel speed sensor 6 (or the vehicle speed) is high or when the yaw angle of the vehicle relative to the line is large than when the vehicle speed is low or when the yaw angle relative to the line is small.

The traveling lane set by the integrated recognition processing unit 104 is given a level of recognition LR. The level of recognition LR of the traveling lane is a numerical representation of the accuracy (or certainty) of the traveling lane, which is set using the accuracy (or certainty of existence) of the non-travelable areas based on the information generated by the obstacle information processing unit 100 and the accuracy (or certainty of existence) of the road markings indicating the lane boundaries based on the information generated by the lane information processing unit 101 in combination. Higher levels are better. The level of recognition LR of the traveling lane provides a measurement for a determination as to whether or not warning or assist is to be performed. If the level of recognition LR is equal to or higher than a first threshold (predetermined threshold), warning or assist is performed, while if the level of recognition LR is lower than the first threshold (predetermined threshold), warning or assist is not performed. In a specific method of calculation of the level of recognition LR of the traveling lane by the integrated recognition processing unit 104, a map representing the relationship between the level of recognition LR of the traveling lane and the number of detected edges. The accuracy (or certainty of existence) of the non-travelable areas based on the information generated by the obstacle information processing unit 100 and the accuracy (or certainty of existence) of the road markings indicating the lane boundaries based on the information generated by the lane information processing unit 101 are proportional to the number of detected edges in detecting the respective objects. In other words, the larger the number of detected edges is, the higher the accuracy of the non-travelable areas and the accuracy of the road markings indicating the lane boundaries are considered to be. Therefore, the level of recognition LR of the traveling lane can be calculated by incorporating the number of detected edges of the non-travelable areas and the road markings indicating the lane boundaries used in setting the traveling lane into a map. In connection with this, setting of the traveling lane itself may be obviated when the number of detected edges does not reach a predetermined number.

The common assist determination unit 105 determines whether or not a driving assist process is to be executed, on the basis of the information generated by the integrated recognition processing unit 104, the result of determination by the lowered consciousness determination unit 102, and the result of determination by the driver's intention determination unit 103. The common assist determination unit 105 may enable the execution of the driving assist process when it is determined by the lowered consciousness determination unit 102 that the driver's consciousness level is low or that the driver is looking aside. The common assist determination unit 105 may restrict the execution of the driving assist process when it is determined by the driver's intention determination unit 103 that the driver is doing an intentional operation. Moreover, the common assist determination unit 105 unconditionally executes the driving assist process when the level of recognition LR of the traveling lane calculated by the integrated recognition processing unit 104 is equal to or higher than a predetermined first threshold Rth. On the other hand, the driving assist process is not executed when the level of recognition LR of the traveling lane is lower than the predetermined first threshold Rth. Alternatively, when the level of recognition LR of the traveling lane is lower than the predetermined threshold Rth, the execution of the driving assist process may be enabled if a particular condition is met. The first threshold Rth mentioned here is a threshold set to determine whether or not to execute the driving assist process unconditionally based only on the level of recognition LR of the traveling lane, and the execution of the driving assist process is enabled unconditionally when the level of recognition LR of the traveling lane is higher than it. Therefore, when the level of recognition LR of the traveling lane is lower than the first threshold Rth, the execution of the driving assist process is restricted in normal circumstances. However, even in conditions in which the execution of the driving assist process is to be restricted due to the level of recognition LR of the traveling lane lower than the first threshold Rth, the execution of the driving assist process may be enabled if at least one of the wakefulness and the degree of driving operation is low.

The warning determination unit 106 determines the time to cause the buzzer 12 to buzz and/or the time to cause the display device 13 to display a warning message or warning light when the execution of the driving assist process is enabled by the common assist determination unit 105. The warning determination unit 106 causes the buzzer 12 to buzz and/or causes the display device 13 to display a warning message or warning light when the estimated time taken for the vehicle to depart from a boundary of the traveling lane with respect to the lateral direction of the vehicle (which will be hereinafter referred to as the estimated time to lane crossing TLC) becomes equal to a predetermined time.

The warning determination unit 106 may be adapted not only to cause the buzzer 12 to buzz and/or to cause the display device 13 to display a warning message or warning light using the traveling lane boundaries as a criterion but also to make the buzzing of the buzzer 12 louder and/or to make the display of the warning message or warning light on the display device 13 larger with the increase in the angle of departure from the traveling lane by considering the traveling lane boundaries potentially having wide range. The warning determination unit 106 may be adapted to cause the buzzer 12 to buzz and/or to cause the display device 13 to display a warning message or warning light when the distance between the vehicle and the traveling lane boundary in the lateral direction of the vehicle becomes equal to or smaller than a predetermined distance. When the vehicle is about to enter a curve or running on a curve, the warning determination unit 106 may cause the buzzer 12 to buzz and/or cause the display device 13 to display a warning message or warning light when the distance between the vehicle and the traveling lane boundary in the traveling direction of the vehicle becomes equal to or smaller than a predetermined distance or becomes zero or when the vehicle crosses the traveling lane boundary. Furthermore, when the vehicle is about to enter a curve or running on a curve, the warning determination unit 106 may cause the buzzer 12 to buzz and/or cause the display device 13 to display a warning message or warning light when the estimated time taken for the vehicle to reach the traveling lane boundary in the traveling direction of the vehicle becomes equal to or shorter than a predetermined time.

The above-described time at which the warning determination unit 106 causes the buzzer 12 to buzz and/or causes the display device 13 to display a warning message or warning light corresponds to the time at which assist is to be performed. In other words, the time at which assist is to be performed is the time at which the vehicle actually performs warning assist.

The value of the estimated time to lane crossing at which assist is to be performed, namely at which the warning determination unit 106 causes the buzzer 12 to buzz and/or causes the display device 13 to display warning message or warning light, is a value that is varied in accordance with the output signal of the wheel speed sensor 6 (vehicle speed) and the output signal of the yaw rate sensor 5 (yaw rate). How the value of the estimated time to lane crossing at which assist is to be performed is determined will be described later.

The way of warning to the driver is not limited to the buzzing of the buzzer 12 and the display of a warning message or warning light on the display device, but other methods such as intermittently changing the fastening torque of the sheet belt may be adopted.

The control determination unit 107 determines, when the execution of the driving assist process is enabled by the common assist determination unit 105, whether or not to cause the electric power steering (EPS) 14 and/or the electronically controlled brake (ECB) 15 to operate. The control determination unit 107 causes the electric power steering (EPS) 14 and/or the electronically controlled brake (ECB) 15 to operate when the estimated time to lane crossing or time until the departure of the vehicle from the traveling lane boundary in the lateral direction of the vehicle becomes equal to or shorter than a predetermined time.

The control determination unit 107 may cause the electric power steering (EPS) 14 and/or the electronically controlled brake (ECB) 15 to operate when the distance between the vehicle and the traveling lane boundary in the lateral direction of the vehicle becomes equal to or smaller than a predetermined distance. When the vehicle is about to enter a curve or running on a curve, the control determination unit 107 may cause the electric power steering (EPS) 14 and/or the electronically controlled brake (ECB) 15 to operate when the distance between the vehicle and the traveling lane boundary in the traveling direction of the vehicle becomes equal to or smaller than a predetermined distance or becomes zero or when the vehicle crosses the traveling lane boundary. Furthermore, when the vehicle is about to enter a curve or running on a curve, the control determination unit 107 may cause the electric power steering (EPS) 14 and/or the electronically controlled brake (ECB) 15 to operate when the time taken for the vehicle to reach the traveling lane boundary in the traveling direction of the vehicle becomes equal to or shorter than a predetermined time.

The time at which the control determination unit 107 causes the electric power steering (EPS) 14 and/or the electronically controlled brake (ECB) 15 to operate corresponds to the time at which assist is to be performed.

The predetermined distance and the predetermined time used by the control determination unit 107 are varied in accordance with the vehicle speed and the yaw rate as with the predetermined distance and the predetermined time used by the warning determination unit 106, but it is preferred that the predetermined distance and the predetermined time used by the control determination unit 107 be set to be shorter than the predetermined distance and the predetermined time used by the warning determination unit 106.

The control amount calculation unit 108 calculates, when a request for actuating the electric power steering (EPS) 14 and/or the electronically controlled brake (ECB) is made by the control determination unit 107, a control amount for the electric power steering (EPS) 14 and/or the electronically controlled brake (ECB) 15 and causes the electric power steering (EPS) 14 and/or the electronically controlled brake (ECB) 15 to operate in accordance with the calculated control amount. The control amount calculation unit 108 calculates a target yaw rate required to avoid departure from the traveling lane using as parameters the information generated by the integrated recognition processing unit 104, the output signal of the wheel speed sensor 6 (vehicle speed), and the output signal of the yaw rate sensor 5 (yaw rate). Specifically, the control amount calculation unit 108 calculates the target yaw rate $Y_{trg}$ by the following equation:

$$Y_{trg} = (\theta \cdot V \sin \theta)/D,$$

where D is the relative distance to the traveling lane boundary, V is the speed of the vehicle (vehicle speed), and $\theta$ is the yaw angle of the vehicle relative to the traveling lane boundary.

The control amount calculation unit 108 calculates a control amount (steering torque) for the electric power steering (EPS) 14 and a control amount (brake oil pressure) for the electronically controlled brake (ECB) 15 using the target yaw rate $Y_{trg}$ as an argument. In connection with this, the relationship between the target yaw rate $Y_{trg}$ and the steering torque and the relationship between the target yaw rate $Y_{trg}$ and the brake oil pressure may be prepared beforehand as maps. When the target yaw rate $Y_{trg}$ is smaller than a predetermined value (the highest value of the yaw rate at which departure from the traveling lane can be avoided only by steering), the brake oil pressure of the electronically controlled brake (ECB) 15 may be set to zero. If different brake pressures are exerted on the friction brakes for the left and right wheels of the vehicle, a yaw rate interfering with the yaw rate generated by the electric power steering (EPS) 14 will be generated. Therefore, it is desirable that the same brake oil pressure be exerted on the friction brakes for the left and right wheels. The control amount calculation unit 108 may be adapted not only to cause the electric power steering (EPS) 14 and the electronically controlled brake (EBC) 15 to operate using the traveling lane boundaries as a criterion but also to make the control values for them larger with the increase in the angle of departure from the traveling lane by considering the traveling lane boundaries potentially having wide range.

The method of decelerating the vehicle is not limited to the actuation of the friction brakes by the electronically controlled brake (ECB) 15, but other methods such as transducing the kinetic energy of the vehicle into electrical energy (regeneration) or increasing the engine brake by changing the gear ratio of the change gear.

The driving assist apparatus described above can provide to the driver warning about departure of the vehicle from the traveling lane that is set on the basis of a lane and non-travelable areas such as obstacles and assist the driver in his/her operation for avoiding the departure from the traveling lane.

(Warning Determination Control)

The warning determination unit 106 performs warning such as buzzing of the buzzer 12 and display of a warning message or warning light by the display apparatus 13 when the estimated time to lane crossing until the departure of the vehicle from the traveling lane boundary becomes equal to a predetermined time.

If warning is performed excessively at early timing, the warning would bother the driver and can probably become unwanted operation unnecessary for the driver. On the other hand, delay in warning will lead to unsatisfactory assist, impairing the significance of the assist. Therefore, it is desired that warning be performed in an optimal way without bothering the driver.

In this embodiment, the value (which is a predetermined time) of the estimated time to lane crossing at which assist is to be performed is varied in accordance with the velocity of the vehicle with respect to the lateral direction. Specifically, velocities of the vehicle with respect to the lateral direction are classified into a plurality of velocity ranges, and the value of the estimated time to lane crossing at which assist is to be performed is varied in accordance with the lateral velocity of the vehicle using different characteristics of the relationship between the lateral velocity of the vehicle and the value of the estimated time to lane crossing at which assist is to be performed in the respective velocity classification ranges. The lateral velocity of the vehicle is the velocity in the direction in which the vehicle departs from the traveling lane boundary, that is, the direction perpendicular to the direction in which the vehicle should travel in the traveling lane or along the traveling lane boundary.

The aforementioned characteristic used in a middle velocity range among the velocity ranges is a characteristic relationship in which the higher the lateral velocity of the vehicle is, the larger the value of the estimated time to lane crossing at which assist is to be performed is. The aforementioned characteristic used in a high velocity range is a characteristic relationship in which the higher the lateral velocity of the vehicle is, the smaller the value of the estimated time to lane crossing at which assist is to be performed is. The aforementioned characteristic used in a low velocity range is a characteristic relationship in which the value of the estimated time to lane crossing at which assist is to be performed is constantly set to zero even if the lateral velocity of the vehicle changes.

Because different characteristics as described above are used in the respective velocity ranges, optimum characteristics can be used in the respective velocity ranges. This enables to select a value of the estimated time to lane crossing at which assist is to be performed that is suitable for the lateral velocity of the vehicle in each velocity range, optimizing the timing of performing assist. It is possible to prevent a situation in which a characteristic relationship in which the value of the estimated time to lane crossing at which assist is to be performed is decreased as the lateral velocity of the vehicle increases is used in the middle velocity range, leading to unsatisfactory warning due to unduly delayed timing of performing assist in the middle velocity range. Furthermore, it is possible to prevent a situation in which a characteristic relationship in which the value of the estimated time to lane crossing at which assist is to be performed is increased as the lateral velocity of the vehicle increases is used in the high velocity range, bothering the driver by warning due to unduly early timing of performing assist in the high velocity range. Still further, it is possible to prevent a situation in which a characteristic relationship in which the value of the estimated time to lane crossing at which assist is to be performed is increased as the lateral velocity of the vehicle increases is used in the low velocity range, leading to unsatisfactory warning due to unduly delayed timing of performing assist in the low velocity range. Therefore, warning can be performed in an optimal way without bothering the driver.

Figure 2:
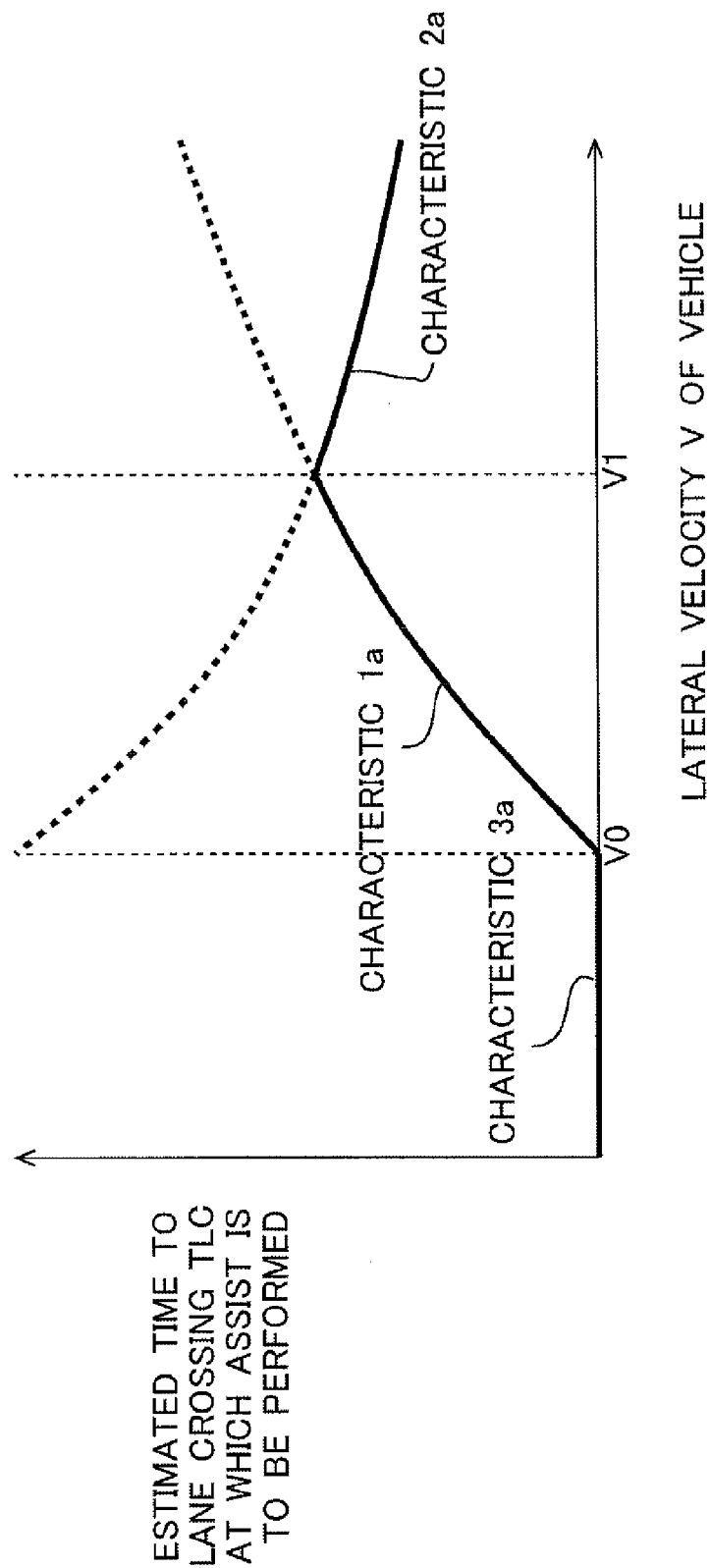
FIG. 2 is a graph showing different characteristics of the relationship between the lateral velocity of the vehicle and the estimated time to lane crossing at which assist is to be performed in respective velocity ranges in warning determination control according to the embodiment 1.
Figure 3:
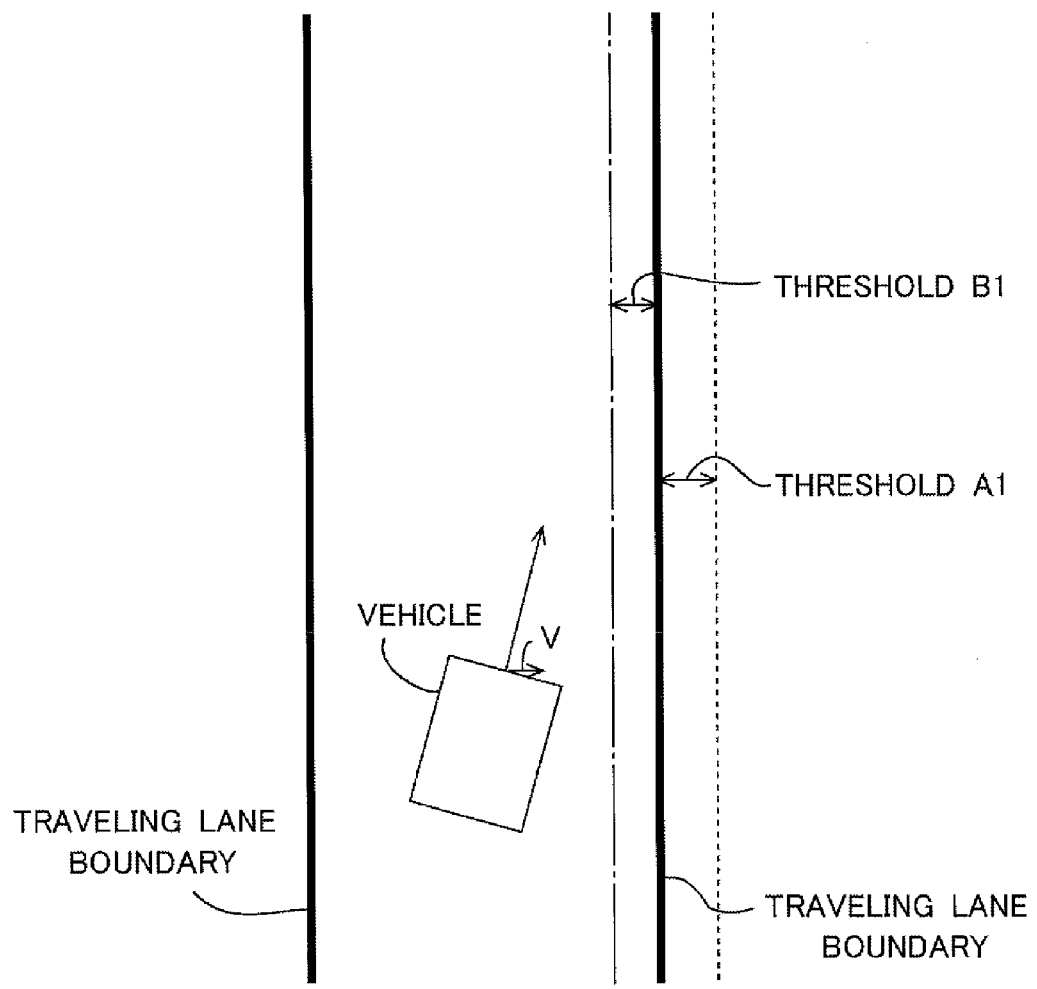
FIG. 3 illustrates thresholds used in the characteristics in the respective velocity ranges in the warning determination control according to the embodiment 1.

FIG. 2 is a graph showing different characteristics of the relationship between the lateral velocity V of the vehicle and the estimated time to lane crossing TLC at which assist is to be performed in the respective velocity ranges in the warning determination control according to the embodiment. FIG. 3 illustrates thresholds used in the characteristics in the respective velocity ranges in the warning determination control according to the embodiment.

In the middle velocity range, characteristic 1a shown in FIG. 2, in which the higher the lateral velocity of the vehicle is, the larger the estimated time to lane crossing at which assist is to be performed is, is used. Characteristic 1a is expressed by the following equation:

$$TLC = (Tr1 \times V - A1)/V,$$
Equation of characteristic 1a:

where TLC is the estimated time to lane crossing, V is the lateral velocity of the vehicle, Tr1 is the response time of the driver to warning, and A1 is a threshold of the distance from the traveling lane boundary at a position outside the traveling lane boundary as shown in FIG. 3. The threshold A1 defines a reference line. The threshold A1 is set in such a way that if the vehicle departs from the traveling lane boundary, warning is actuated at timing that allows the driver to respond before the vehicle exceeds the reference line defined by the threshold A1. The reference line defined by the threshold A1 may be set at the traveling lane boundary itself.

In the high velocity range, characteristic 2a shown in FIG. 2, in which the higher the lateral velocity of the vehicle is, the smaller the estimated time to lane crossing at which assist is to be performed is, is used. Characteristic 2a is expressed by the following equation:

$$TLC = B1/V,$$
Equation of characteristic 2a:

where TLC is the estimated time to lane crossing, V is the lateral velocity of the vehicle, and B1 is a threshold of the distance from the traveling lane boundary at a position inside the traveling lane as shown in FIG. 3. The threshold B1 defines a reference line. The threshold B1 is a value that is set in order for warning not to be provided until a situation occurs in which the distance to the traveling lane boundary becomes smaller than the threshold B1, the situation is considered not to occur in normal traveling. The threshold B1 is set in this way because if the estimated time to lane crossing at which assist is to be performed is set to be large according to the equation of characteristic 1a even in the high velocity range, the timing to perform assist will be so early that assist of warning bothers the driver.

In the low velocity range, characteristic 3a shown in FIG. 2, in which the estimated time to lane crossing at which assist is to be performed is constantly zero even if the lateral velocity of the vehicle changes, is used. Characteristic 3a is expressed by the following equation:

$$TLC=0, \quad \text{Equation of characteristic 3a:}$$

where TLC is the estimated time to lane crossing. In characteristic 3a, the traveling lane boundary constitutes a reference line.

In FIG. 2, the velocity ranges are sectioned at the lateral velocities of the vehicle corresponding to the point of intersection of characteristic 1a and characteristic 2a and the point of intersection of characteristic 1a and characteristic 3a. However, the velocity ranges may be sectioned at velocities other than the lateral velocities of the vehicle corresponding to the points of intersection of characteristics 1a to 3a.

The threshold A1 and B1 are set relative to the case where the traveling lane boundaries are set to coincide with the lane. Specifically, in the case where the traveling lane boundaries are set outside the lane, the threshold A1 is set smaller than that in the case where the traveling lane boundaries are set to coincide with the lane, so as to reduce the amount of departure of the vehicle from the lane. The threshold B1 is set larger in the case where the traveling lane boundaries are set outside the lane than in the case where the traveling lane boundaries are set to coincide with the lane, so as to leave a predetermined distance to the lane.

(Warning Determination Control Routine)

Figure 4:
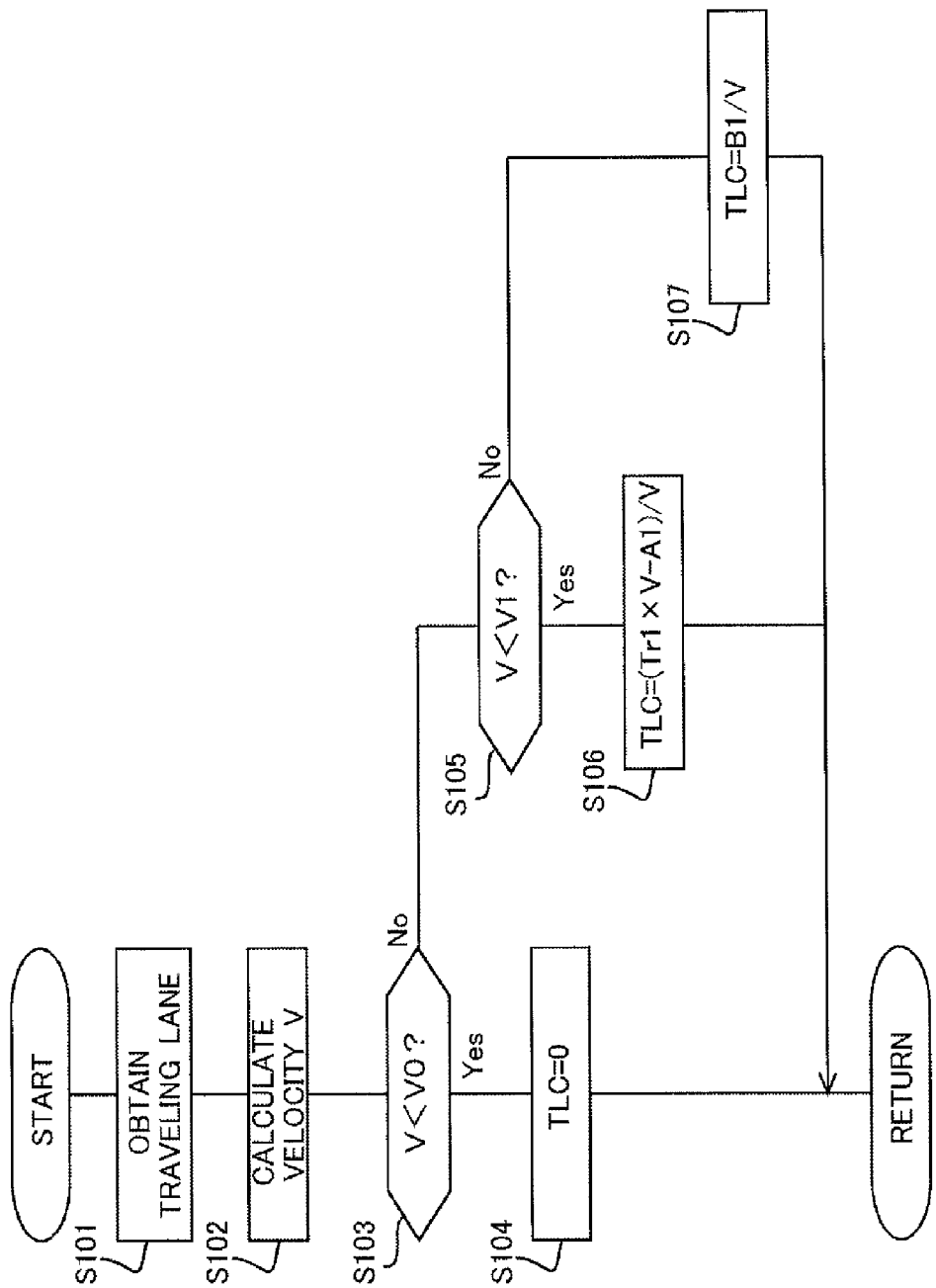
FIG. 4 is the flow chart of a warning determination control routine in the embodiment 1.

A warning determination control routine in the warning determination unit 106 will be described with reference to a flow chart of FIG. 4. FIG. 4 is the flow chart of the warning determination control routine. This routine is executed by the warning determination unit 106 of the ECU 1 repeatedly at regular time intervals.

As the routine shown in FIG. 4 is started, the traveling lane set by the integrated recognition processing unit 104 is obtained in step S101. In step S102, the lateral velocity V of the vehicle is calculated. The lateral velocity V of the vehicle is calculated as a velocity in the direction perpendicular to the direction of the traveling lane, on the basis of the velocity of the vehicle in the traveling direction, the traveling direction of the vehicle, and the direction of the obtained traveling lane. Alternatively, the lateral velocity V of the vehicle may be calculated on the basis of the velocity of the vehicle in the traveling direction and the steering, torque or the steering force exerted by the driver.

In step S103, a determination is made as to whether or not the lateral velocity V of the vehicle is smaller than the velocity V0 at the boundary of the low velocity range and the middle velocity range. The velocity V0 is the velocity at the point of intersection of characteristic 1a and characteristic 3a shown in FIG. 2. If the determination in step S103 is affirmative, the process proceeds to step S104. In step S104, it is concluded that the lateral velocity V of the vehicle falls within the low velocity range, and the value of the estimated time to lane crossing at which assist is to be performed is set according to the equation of characteristic 3a: TLC=0. In other words, warning is to be actuated on the traveling lane boundary, in this case.

If the determination in step S103 is negative, the process proceeds to S105. In step S105, a determination is made as to whether or not the lateral velocity of the vehicle is smaller than the velocity V1 at the boundary of the middle velocity range and the high velocity range. The velocity V1 is the velocity at the point of intersection of characteristic 1a and characteristic 2a shown in FIG. 2. If the determination in step S105 is affirmative, the process proceeds to step S106. In step S106, it is concluded that the lateral velocity V of the vehicle falls within the middle velocity range, and the value of the estimated time to lane crossing at which assist is to be performed is set according to the equation of characteristic 1a: TLC=(Tr1×V−A1)/V. In other words, warning is actuated at timing that allows the driver to respond before the vehicle exceeds the line defined by the threshold A1.

If the determination in step S105 is negative, the process proceeds to S107. In step S107, it is concluded that the lateral velocity V of the vehicle falls within the high velocity range, and the value of the estimated time to lane crossing at which assist is to be performed is set according to the equation of characteristic 2a: TLC=B1/V. In other words, warning is actuated when the distance between the vehicle and the traveling lane boundary becomes smaller than the threshold B1.

With the above-described routine, the timing of performing assist can be optimized. Thus, it is possible to prevent a situation in which the timing of performing assist is too early, bothering the driver by warning and a situation in which the timing of performing assist is too late, leading to unsatisfactory warning. Therefore, warning can be performed in an optimal way without bothering the driver.

(Control operation Determination Control)

The control determination unit 107 causes the electric power steering (EPS) 14 and the electronically controlled brake (ECB) 15 to operate when the estimated time to lane crossing until the departure of the vehicle from the traveling lane boundary becomes equal to a predetermined time. Hereinafter, causing the electric power steering (EPS) 14 and the electronically controlled brake (ECB) 15 to operate will be referred to as "control operation".

If the control operation is performed excessively at early timing, the control operation would bother the driver and can probably become unwanted operation unnecessary for the driver. On the other hand, delay in the control operation will lead to unsatisfactory assist, impairing the significance of the assist. Therefore, it is desired that the control operation be performed in an optimal way without bothering the driver.

In this embodiment, the value (which is a predetermined time) of the estimated time to lane crossing at which assist is to be performed is varied in relation to the lateral velocity of the vehicle. Specifically, lateral velocities of the vehicle are classified into a plurality of velocity ranges, and the value of the estimated time to lane crossing at which assist is to be performed is varied in accordance with the lateral velocity of the vehicle using different characteristics of the relationship between the lateral velocity of the vehicle and the value of the estimated time to lane crossing at which assist is to be performed in the respective velocity classification ranges.

The above-mentioned characteristics used in the respective velocity ranges are similar to those used in the warning determination control. Specifically, the aforementioned characteristic used in a middle velocity range is a characteristic relationship in which the higher the lateral velocity of the vehicle is, the larger the value of the estimated time to lane crossing at which assist is to be performed is. The aforementioned characteristic used in a high velocity range is a characteristic relationship in which the higher the lateral velocity of the vehicle is, the smaller the value of the estimated time to lane crossing at which assist is to be performed is. The aforementioned characteristic used in a low velocity range is a characteristic relationship in which the value of the estimated time to lane crossing at which assist is to be performed is constantly set to zero even if the lateral velocity of the vehicle changes.

Because different characteristics as described above are used in the respective velocity ranges, optimal characteristics can be used in the respective velocity ranges. This enables to select a value of the estimated time to lane crossing at which assist is to be performed that is suitable for the lateral velocity of the vehicle in each velocity range, optimizing the timing of performing assist. It is possible to prevent a situation in which a characteristic relationship in which the value of the estimated time to lane crossing at which assist is to be performed is decreased as the lateral velocity of the vehicle increases is used in the middle velocity range, leading to unsatisfactory control operation due to unduly delayed timing of performing assist in the middle velocity range. Furthermore, it is possible to prevent a situation in which a characteristic relationship in which the value of the estimated time to lane crossing at which assist is to be performed is increased as the lateral velocity of the vehicle increases is used in the high velocity range, bothering the driver by the control operation due to unduly early timing of performing assist in the high velocity range. Still further, it is possible to prevent a situation in which a characteristic relationship in which the value of the estimated time to lane crossing at which assist is to be performed is increased as the lateral velocity of the vehicle increases is used in the low velocity range, leading to unsatisfactory control operation due to unduly delayed timing of performing assist in the low velocity range. Therefore, control operation can be performed in an optimal way without bothering the driver.

Figure 5:
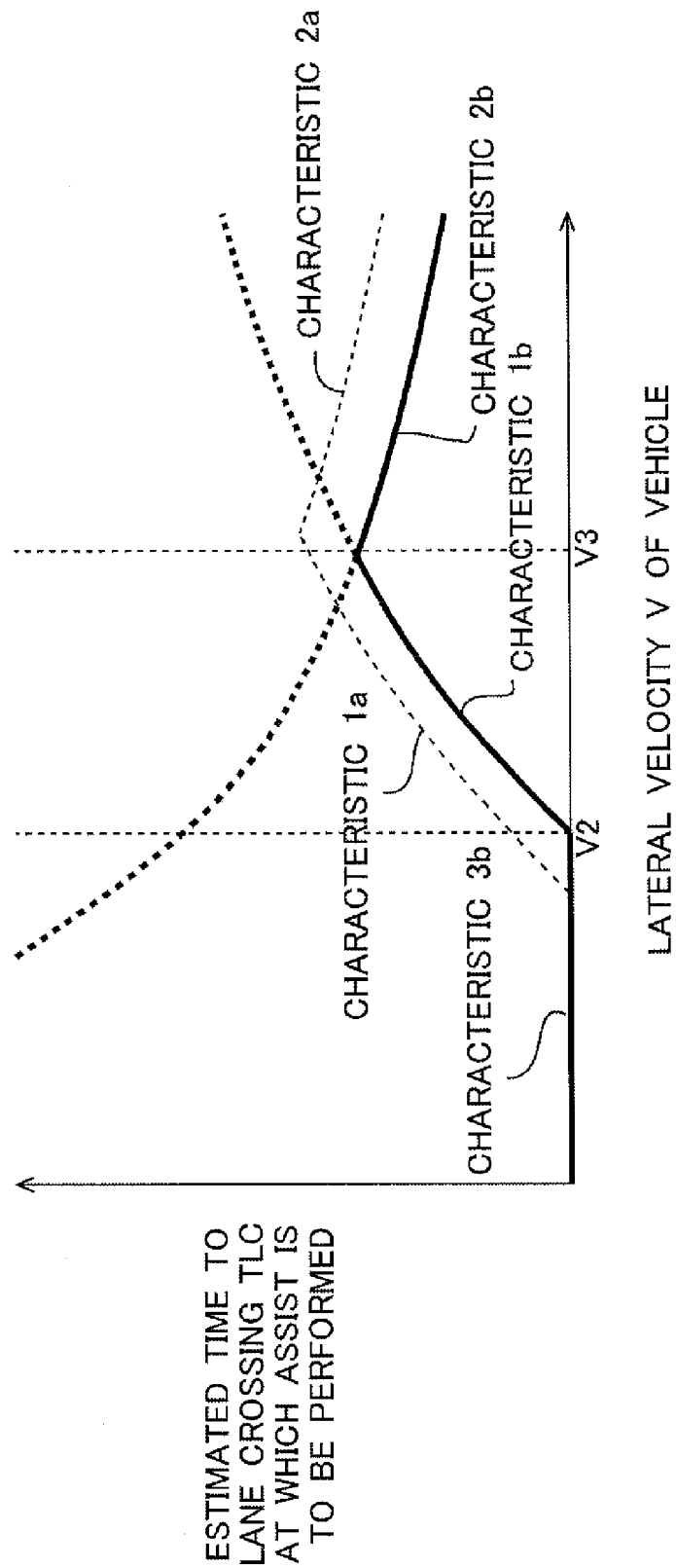
FIG. 5 is a graph showing different characteristics of the relationship between the lateral velocity of the vehicle and the estimated time to lane crossing at which assist is to be performed in the respective velocity ranges in a control operation determination control according to the embodiment 1.
Figure 6:
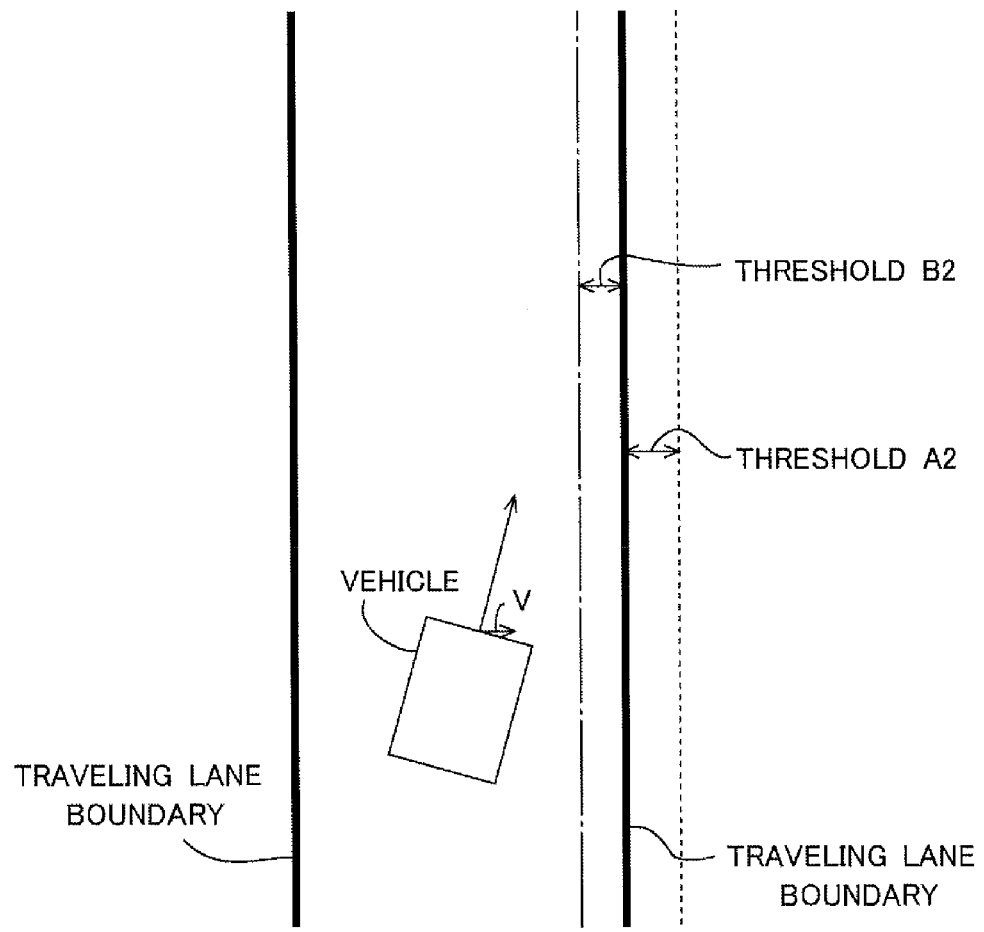
FIG. 6 illustrates thresholds used in the characteristics in the respective velocity ranges in the control operation determination control according to the embodiment 1.

FIG. 5 is a graph showing different characteristics of the relationship between the lateral velocity V of the vehicle and the estimated time to lane crossing TLC at which assist is to be performed in the respective velocity ranges in the control operation determination control according to the embodiment. In the characteristics in FIG. 5, the estimated time to lane crossing TLC at which assist is to be performed is smaller than that in the characteristics shown in FIG. 2 used by the warning determination unit 106. FIG. 6 illustrates thresholds used in the characteristics in the respective velocity ranges in the control operation determination control according to the embodiment.

In the middle velocity range, characteristic 1b shown in FIG. 5, in which the higher the lateral velocity of the vehicle is, the larger the estimated time to lane crossing at which assist is to be performed is, is used. Characteristic 1b is expressed by the following equation:

$$TLC = (Tr2 \times V - A2)/V, \quad \text{Equation of characteristic 1b:}$$

where TLC is the estimated time to lane crossing, V is the lateral velocity of the vehicle, Tr2 is the response time of the vehicle to the control operation, and A2 is a threshold of the distance from the traveling lane boundary at a position outside the traveling lane boundary as shown in FIG. 6. The threshold A2 defines a reference line. The threshold A2 is set in such a way that if the vehicle departs from the traveling lane boundary, control operation is performed at such timing as to prevent the vehicle from exceeding the reference line defined by the threshold A2. The reference line defined by the threshold A2 may be set at the traveling lane boundary itself.

In the high velocity range, characteristic 2b shown in FIG. 5, in which the higher the lateral velocity of the vehicle is, the smaller the estimated time to lane crossing at which assist is to be performed is, is used. Characteristic 2b is expressed by the following equation:

$$TLC = B2/V, \quad \text{Equation of characteristic 2b:}$$

where TLC is the estimated time to lane crossing, V is the lateral velocity of the vehicle, and B2 is a threshold of the distance from the traveling lane boundary at a position inside the traveling lane boundary as shown in FIG. 6. The threshold B2 defines a reference line. The threshold B2 is a value that is set in order for the control operation not to be performed until a situation occurs in which the distance to the traveling lane boundary becomes smaller than the threshold B2, the situation is considered not to occur in normal traveling. The threshold B2 is set in this way because if the estimated time to lane crossing at which assist is to be performed is set to be large according to the equation of characteristic 1b even in the high velocity range, the timing to perform assist will be so early that control operation bothers the driver.

In the low velocity range, characteristic 3b shown in FIG. 5, in which the estimated time to lane crossing at which assist is to be performed is constantly zero even if the lateral velocity of the vehicle changes, is used. Characteristic 3b is expressed by the following equation:

$$TLC = 0, \quad \text{Equation of characteristic 3b:}$$

where TLC is the estimated time to lane crossing. In characteristic 3b, the traveling lane boundary constitutes a reference line.

In FIG. 5, the velocity ranges are sectioned at the lateral velocities of the vehicle corresponding to the point of intersection of characteristic 1b and characteristic 2b and the point of intersection of characteristic 1b and characteristic 3b. However, the velocity ranges may be sectioned at velocities other than the lateral velocities of the vehicle corresponding to the points of intersection of characteristics 1b to 3b.

The threshold A2 and B2 are set relative to the case where the traveling lane boundaries are set to coincide with the lane. Specifically, in the case where the traveling lane boundaries are set outside the lane, the threshold A2 is set smaller than that in the case where the traveling lane boundaries are set to coincide with the lane, so as to reduce the amount of departure of the vehicle from the lane. The threshold A2 is set to be equal to or larger than the threshold A1 used by the warning determination unit 106. The threshold B2 is set larger in the case where the traveling lane boundaries are set outside the lane than in the case where the traveling lane boundaries are set to coincide with the lane, so as to leave a predetermined distance to the lane. The threshold B2 is set to be equal to or smaller than the threshold B1 used by the warning determination unit 106.

(Control Operation Determination Control Routine)

Figure 7:
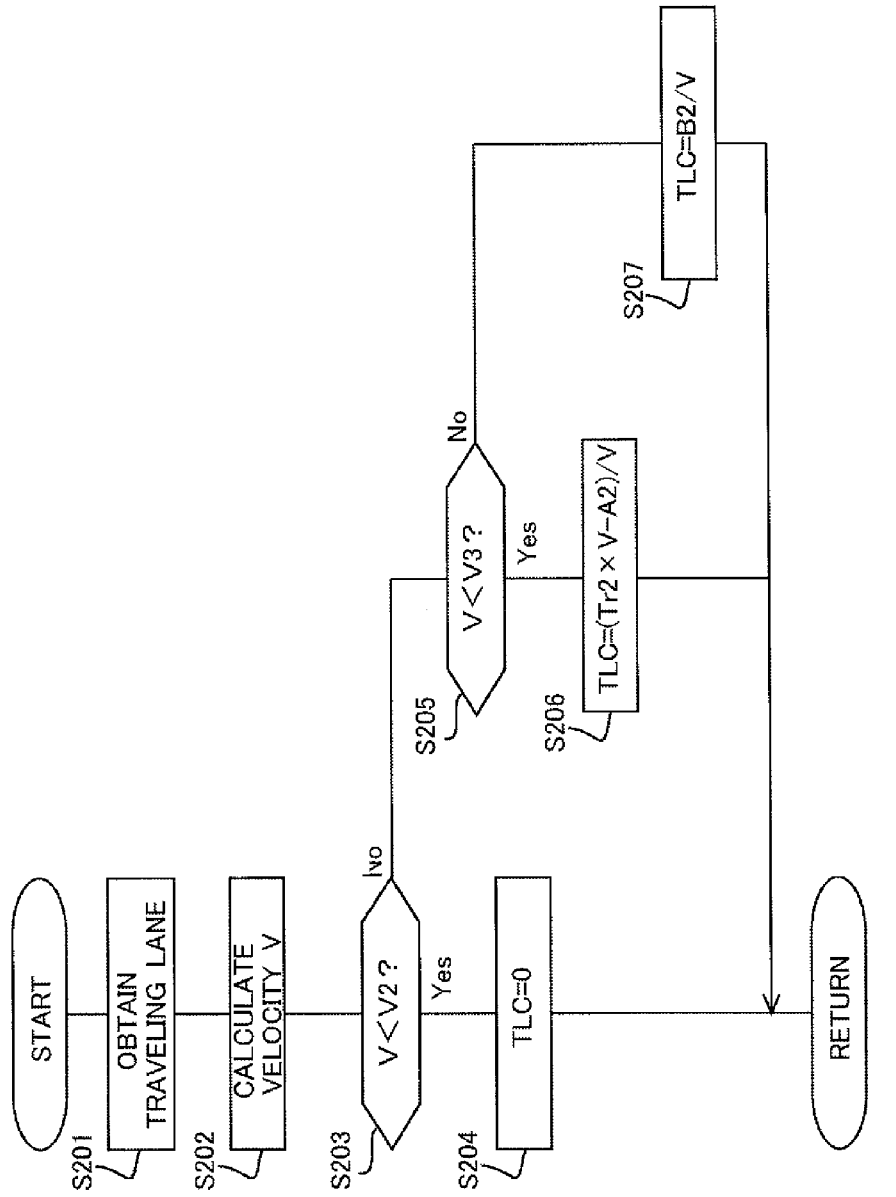
FIG. 7 is the flow chart of the control operation determination control routine according to the embodiment 1.

A control operation determination control routine in the control determination unit 107 will be described with reference to a flow chart of FIG. 7. FIG. 7 is the flow chart of the control operation determination control routine. This routine is executed by the control determination unit 107 of the ECU 1 repeatedly at regular time intervals.

As the routine shown in FIG. 7 is started, the traveling lane set by the integrated recognition processing unit 104 is obtained in step S201. In step S202, the lateral velocity V of the vehicle is calculated. The lateral velocity V of the vehicle is calculated as a velocity in the direction perpendicular to the direction of the traveling lane, on the basis of the velocity of the vehicle in the traveling direction, the traveling direction of the vehicle, and the direction of the obtained traveling lane. Alternatively, the lateral velocity V of the vehicle may be calculated on the basis of the velocity of the vehicle in the traveling direction and the steering torque or the steering force exerted by the driver.

In step S203, a determination is made as to whether or not the lateral velocity V of the vehicle is smaller than the velocity V2 at the boundary of the low velocity range and the middle velocity range. The velocity V2 is the velocity at the point of intersection of characteristic 1b and characteristic 3b shown in FIG. 6. If the determination in step S203 is affirmative, the process proceeds to step S204. In step S204, it is concluded that the lateral velocity V of the vehicle falls within the low velocity range, and the value of the estimated time to lane crossing at which assist is to be performed is set according to the equation of characteristic 3b: TLC=0. In other words, the control operation is to be actuated on the traveling lane boundary, in this case.

If the determination in step S203 is negative, the process proceeds to S205. In step S205, a determination is made as to whether or not the lateral velocity of the vehicle is smaller than the velocity V3 at the boundary of the middle velocity range and the high velocity range. The velocity V3 is the velocity at the point of intersection of characteristic 1b and characteristic 2b shown in FIG. 6. If the determination in step S205 is affirmative, the process proceeds to step S206. In step S206, it is concluded that the lateral velocity V of the vehicle falls within the middle velocity range, and the value of the estimated time to lane crossing at which assist is to be performed is set according to the equation of characteristic 1b: TLC=(Tr2×V−A2)/V. In other words, the control operation is actuated at timing that prevents the vehicle from exceeding the line defined by the threshold A2.

If the determination in step S205 is negative, the process proceeds to S207. In step S207, it is concluded that the lateral velocity V of the vehicle falls within the high velocity range, and the value of the estimated time to lane crossing at which assist is to be performed is set according to the equation of characteristic 2b: TLC B2/V. In other words, the control operation is actuated when the distance between the vehicle and the traveling lane boundary becomes smaller than the threshold B2.

With the above-described routine, the timing of performing assist can be optimized. Thus, it is possible to prevent a situation in which the timing of performing assist is too early, bothering the driver by the control operation and a situation in which the timing of performing assist is too late, leading to unsatisfactory control operation. Therefore, the control operation can be performed in an optimal way without bothering the driver.

(Others)

The travel assist apparatus according to the present invention is not limited to the above-described embodiment, but various modifications may be made thereto without departing from the essence of the present invention. In the embodiment, the estimated time to lane crossing (TLC) at which assist is to be performed is set on the basis of the equations of characteristics 1a to 3b. However, the travel assist apparatus according to the present invention just has to use a characteristic in which the higher the lateral velocity of the vehicle is, the larger the estimated time to lane crossing at which assist is to be performed is in the middle velocity range and use a characteristic in which the higher the lateral velocity of the vehicle is, the smaller the estimated time to lane crossing at which assist is to be performed is in the high velocity range. In the embodiment, there has been described, by way of example, a travel assist apparatus such as an LDP apparatus that sets the estimated time to lane crossing (TLC) at which assist is to be performed relative to a boundary of a traveling lane set on the basis of information provided by the obstacle information processing unit 100 and the lane information processing unit 101. However, the travel assist apparatus according to the present invention may be adapted to set the estimated time to lane crossing (TLC) at which assist is to be performed relative only to a recognized lane. The above-described embodiment also serves as an embodiment of the travel assist method according to the present invention.

REFERENCE SIGNS LIST

1: ECU
2: radar device
3: exterior camera
4: driver camera
5: yaw rate sensor
6: wheel speed sensor
7: brake sensor
8: accelerator sensor
9: winker switch
10: steering angle sensor
11: steering torque sensor
12: buzzer
13: display device
14: EPS
15: ECB
100: obstacle information processing unit
101: lane information processing unit
102: lowered consciousness determination unit
103: driver's intention determination unit
104: integrated recognition processing unit
105: common assist determination unit
106: warning determination unit
107: control determination unit
108: control amount calculation unit

The invention claimed is:

1. A travel assist apparatus that performs assist for preventing departure of a vehicle in a lateral direction of the vehicle, comprising an electronic control unit which
sets a travel assist line from which the vehicle should be prevented from departing;
calculates an estimated time to lane crossing which is an estimated time taken for the vehicle to depart from the travel assist line based on a present state of the vehicle; and
determines a time at which assist is to be performed which is a time at which the vehicle actually performs assist based on the estimated time to lane crossing and a value of the estimated time to lane crossing at which assist is to be performed which is determined as a threshold for the estimated time to lane crossing, wherein
the electronic control unit varies the value of the estimated time to lane crossing at which assist is to be performed in accordance with a velocity of the vehicle in the lateral direction using different characteristics of relationship between the velocity of the vehicle in the lateral direction and the value of the estimated time to lane crossing at which assist is to be performed in respective velocity ranges into which velocities of the vehicle in the lateral direction are classified.

2. The travel assist apparatus according to claim 1, wherein the electronic control unit causes the vehicle to perform the assist for preventing departure of the vehicle in the lateral direction of the vehicle based on the determined time at which the assist is to be performed.

3. A travel assist apparatus that performs assist for preventing departure of a vehicle in a lateral direction of the vehicle, comprising an electronic control unit which
sets a travel assist line from which the vehicle should be prevented from departing;

calculates an estimated time to lane crossing which is an estimated time taken for the vehicle to depart from the travel assist line based on a present state of the vehicle; and determines a time at which assist is to be performed which is a time at which the vehicle actually performs assist based on the estimated time to lane crossing and a value of the estimated time to lane crossing at which assist is to be performed which is determined as a threshold for the estimated time to lane crossing, wherein, in a high velocity range among velocity ranges into which velocities of the vehicle in the lateral direction are classified, the electronic control unit varies the value of the estimated time to lane crossing at which assist is to be performed in accordance with the velocity of the vehicle in the lateral direction using a characteristic relationship in which as the velocity of the vehicle in the lateral direction increases, the value of the estimated time to lane crossing at which assist is to be performed decreases.

4. The travel assist apparatus according to claim 3, wherein, in a middle velocity range among the velocity ranges into which velocities of the vehicle in the lateral direction are classified, the electronic control unit varies the value of the estimated time to lane crossing at which assist is to be performed in accordance with the velocity of the vehicle in the lateral direction using a characteristic relationship in which as the velocity of the vehicle in the lateral direction increases, the value of the estimated time to lane crossing at which assist is to be performed increases.

5. The travel assist apparatus according to claim 4, wherein, for each velocity range of the plurality of velocity ranges, the electronic control unit uses different lines as reference lines running by a side of the vehicle, which are used to set the value of the estimated time to lane crossing at which assist is to be performed.

6. The travel assist apparatus according to claim 3, wherein the electronic control unit causes the vehicle to perform the assist for preventing departure of the vehicle in the lateral direction of the vehicle based on the determined time at which the assist is to be performed.

7. A travel assist method of performing assist for preventing departure of a vehicle in a lateral direction of the vehicle, the method comprising steps of setting, by an electronic control unit, a travel assist line from which the vehicle should be prevented from departing;

calculating, by the electronic control unit, an estimated time to lane crossing which is an estimated time taken for the vehicle to depart from the travel assist line based on a present state of the vehicle; and determining, by the electronic control unit, a time at which assist is to be performed which is a time at which the vehicle actually performs assist based on the estimated time to lane crossing and a value of the estimated time to lane crossing at which assist is to be performed which is determined as a threshold for the estimated time to lane crossing, wherein a value of the estimated time to lane crossing at which assist is to be performed is varied by the electronic control unit in accordance with a velocity of the vehicle in the lateral direction using different characteristics of relationship between the velocity of the vehicle in the lateral direction and the value of the estimated time to lane crossing at which assist is to be performed in respective velocity ranges into which velocities of the vehicle in the lateral direction are classified.

8. The travel assist method according to claim 7, further comprising:

causing the vehicle to perform the assist for preventing departure of the vehicle in the lateral direction of the vehicle based on the determined time at which the assist is to be performed.

9. A travel assist method of performing assist for preventing departure of a vehicle in a lateral direction of the vehicle, the method comprising steps of setting, by an electronic control unit, a travel assist line from which the vehicle should be prevented from departing;

calculating, by the electronic control unit, an estimated time to lane crossing which is an estimated time taken for the vehicle to depart from the travel assist line based on a present state of the vehicle; and determining, by the electronic control unit, a time at which assist is to be performed which is a time at which the vehicle actually performs assist based on the estimated time to lane crossing and a value of the estimated time to lane crossing at which assist is to be performed which is determined as a threshold for the estimated time to lane crossing, wherein, in a high velocity range among velocity ranges into which velocities of the vehicle in the lateral direction are classified, the value of the estimated time to lane crossing at which assist is to be performed is varied by the electronic control unit in accordance with the velocity of the vehicle in the lateral direction using a characteristic relationship in which as the velocity of the vehicle in the lateral direction increases, the value of the estimated time to lane crossing at which assist is to be performed decreases.

10. The travel assist method according to claim 9, further comprising:

causing the vehicle to perform the assist for preventing departure of the vehicle in the lateral direction of the vehicle based on the determined time at which the assist is to be performed.

* * * * *